United States Patent [19]

Goodrich

[11] Patent Number: 5,261,779
[45] Date of Patent: Nov. 16, 1993

[54] DUAL HYDRAULIC, PARALLELOGRAM ARM WHEELCHAIR LIFT

[75] Inventor: Ronald W. Goodrich, Logansport, Ind.

[73] Assignee: The Braun Corporation, Winamac, Ind.

[21] Appl. No.: 825,625

[22] Filed: Jan. 24, 1992

[51] Int. Cl.⁵ .............................................. B60P 1/44
[52] U.S. Cl. ..................................... 414/546; 414/917; 414/921
[58] Field of Search ............... 414/540, 545, 546, 554, 414/556, 557, 786, 917, 921

[56] References Cited

U.S. PATENT DOCUMENTS

| | | | |
|---|---|---|---|
| Re. 31,178 | 3/1983 | Deacon | 414/546 |
| 2,656,058 | 10/1953 | Foote . | |
| 2,774,494 | 12/1956 | Malmström | 414/546 |
| 3,666,122 | 5/1972 | Youmans | 414/917 X |
| 3,700,123 | 10/1972 | Corley, Jr. | 414/917 X |
| 3,888,463 | 6/1975 | O'Brien et al. | 414/921 X |
| 3,984,014 | 10/1976 | Pohl | 414/921 X |
| 4,015,725 | 4/1977 | Ryan et al. | 414/921 X |
| 4,111,317 | 9/1978 | Robinson | 414/557 X |
| 4,534,450 | 8/1985 | Savaria | 187/9 R |
| 4,664,584 | 5/1987 | Braun et al. | 414/541 |
| 4,711,613 | 12/1987 | Fretwell | 414/921 X |
| 4,808,056 | 2/1989 | Oshima | 414/921 X |
| 4,930,973 | 6/1990 | Robinson | 414/917 X |

FOREIGN PATENT DOCUMENTS

| | | | |
|---|---|---|---|
| 3627476 | 2/1988 | Fed. Rep. of Germany | 414/917 |
| 1-86541 | 11/1982 | Japan | 414/921 |
| 723613 | 2/1955 | United Kingdom | 414/557 |

Primary Examiner—David A. Bucci
Attorney, Agent, or Firm—Jacques M. Dulin; Thomas C. Feix

[57] ABSTRACT

An improved dual hydraulic, parallelogram arm wheel chair lift assembly for use in commercial vehicles, such as vans or buses. The lift assembly includes a platform connected at one end to a pair of parallelogram linkages, each of which is provided with a power-up, gravity-down hydraulic cylinder for pulling the parallelogram linkages and platform from a lowered loading position to an immediate transfer position, and thence to a folded, generally upright stored position. The pulling action of the hydraulic cylinders with hydraulic fluid working on the rod side reduces side loading on the piston head and wear on pivot pins of the parallelogram linkages. The hydraulic cylinders are self-bleeding of air during gravity down operation to reduce spongy and jerky operation. The lift assembly has an improved base member employing an additional base support plate to form a box structure to increase strength and reduce moment-induced bending of the mounting plate. Tie downs are also provided to the side supports to assist in reducing sway movement of the side supports. An improved, highly precise microswitch trigger assembly mounted independent of arm pivot pins and large bearing surface fixed arm pivot pins are disclosed. The hydraulic cylinders are mounted base down and act at right angles to the conventional mounting scheme, with full extension at lower load position and fully closed (retracted) at the upper stowed position.

22 Claims, 5 Drawing Sheets

Fig_1 (PRIOR ART)

Fig_2 (PRIOR ART)

Fig_7

Fig_8

Fig_9

Fig_10

Fig_11

Fig_12

DUAL HYDRAULIC, PARALLELOGRAM ARM WHEELCHAIR LIFT

FIELD

This invention relates to wheelchair lifts, and more particularly to lifts for transit vehicles, employing improved dual hydraulic parallelogram arm type lift assemblies.

BACKGROUND

Lifts for wheelchair bound handicapped persons evolved from truck-type tailgate lifts in the mid-60's to early 70's. A wide variety of lift types have been employed, including: chain drive parallelogram lifts of the Deacon U.S. Pat. No. Re. 31,178; chain driven slide tube type lifts, such as The Braun Corporation Lift-A-Way ® lift; rotary lifts such as The Braun Corporation Swing-A-Way ® lift of Braun et al. U.S. Pat. No. 4,664,584; and dual parallelogram arm hydraulic lifts, such as shown in the Savaria U.S. Pat. No. 4,534,450 (original Savaria cafe-door style lift).

The advantage touted for the chain drive lift of the Deacon lift as compared to the dual parallelogram arm hydraulic lift of Savaria is that the chain drive provides a more smooth and less jerky lift motion. Both of these lift types are offered by Ricon Corporation of Pacoima, Calif. as the R30 (Deacon style) and the R2000 (an extensively modified version of the Savaria lift but not covered by the Savaria patent as it has a single platform and dual hydraulic rams).

The model R30 is directed for use in the retail market, i.e., for individual owners of private vehicles, while the R2000 is designed for use in commercial applications, such as in public buses and vans. The reason for the particular use application for each style of lift is due in significant part to the materials and construction used in each lift. In the R30, the arms of the parallelogram linkages are constructed of solid, flat aluminum bars which are not well-suited for withstanding the continuous and varied use demands placed on a commercial lift. The R30 flat bar stock permits too much side sway for use with hydraulics in a commercial environment. In contrast the R2000 uses U-channel steel arms and links which are better suited for operation in a commercial environment.

One disadvantage of the R2000 is that the hydraulic cylinders of the lift are prone to spongy and uneven operation. This results in the dual problems of platform drift and misalignment of the parallelogram arms with respect to each other. Drift occurs when the lift platform is left overnight in the vertical stowed position and it begins to pop partly open under the force of a spring which is provided to power the initial deployment of the lift downward from a near vertical or oververtical position. Drift is symptomatic of wear in the hydraulic seals, which permits fluid to leak past the seals. When this occurs the lift partially descends due to the spring bias and gravity effect. In some instances, this partial opening drift can result in the lift becoming wedged against the inside of the door of the van in which it is mounted. In such a situation it must be first powered closed before the van door can be opened. If the operator does not perceive that drift has occurred, the door and/or lift can be significantly damaged if the operator attempts to open the door.

Further, there is a serious and difficult problem in the synchronization between the two push-type hydraulic cylinders, each of which powers one of the arm linkages. If there is a differential amount of leakage, or air gets in the fluid, as is almost inevitable, or there is differential line loss (friction in the lines), then the two parallelogram linkages descend or lift unevenly. As a result, they do not arrive at the same angular (elevational) position at the same time or at the same rate. This causes a torsional twisting of the lift and places substantial side piston loads on the arm and seal mechanisms of the parallelogram linkages and the hydraulic cylinders. This, of course, increases wear, induces binding and causes elongation of the bushings associated with all the pivot points of the parallelogram linkages. When the binding is suddenly released, the lift has a jerky motion. This uneven and spongy cylinder operation promotes parallelogram arm alignment problems which, in turn, induces wear on all moving parts, including cylinder seals and pivot pins. The uneven wear in turn further compounds the problem of uneven and spongy push-type cylinder operation.

Another aspect of these problems lies in the fact that the lifts must stop in various predetermined positions in the cycle, for example, at the transfer level, that is, where the platform stops at a level even with the van or bus floor to permit ingress into or egress out from the vehicle. In the R2000 two positioning cams are fastened to a hydraulic cylinder cross-pin so that the cams follow the position of the hydraulic cylinder in the cycle. These cams alternately engage and actuate several microswitches associated with the various predetermined positions of the cycle. Since this hydraulic pivot pin is under high stress and experiences excessive side loading from the pushing action of the hydraulic cylinder associated therewith, the bushing surface of this pivot pin tends to become elongated over time. This, in turn, can result in misalignment of the positioning cam. Pivot pin elongation in combination with platform drift significantly upsets the microswitch operation of the positioning cams, thus requiring frequent field readjustments of the positioning cams to restore proper lift operation with precise platform stop positions.

Accordingly, there is a need in the art for improved hydraulic drives for parallelogram arm lifts which have reduced asynchronous movement, jerkiness, platform drift, positioning cam misalignment, and bearing elongation for easier field maintenance and capability of reliable operation in high frequency use transit vehicle environments.

THE INVENTION

OBJECTS

It is a principle object of the invention to provide an improved dual hydraulic parallelogram arm wheelchair lift assembly, which uses "pull" type hydraulic cylinders for smoother lifting operation and improved synchronous parallelogram arm movement;

It is another object of the invention to provide an improved wheelchair lift assembly wherein the hydraulic cylinders are self-bleeding during gravity down operation;

It is another object of the invention to provide an improved wheelchair lift assembly wherein the pulling action of the hydraulic cylinders minimizes side loading on the piston head seals during lifting, promotes proper alignment of the parallelogram linkages and thereby minimizes binding of the moving parts and prevents premature wear of the pivot pins;

It is another object of the invention to provide an improved pivot pin assembly for the cylinder and arm connections of parallelogram linkages whereby the improved pivot pin assemblies have a greater bearing service area to resist elongation wear;

It is another object of the invention to provide a single cam switch operator to overcome the misalignment problems of two cams with respect to each other;

It is another object of the invention to provide an improved parallelogram style wheelchair lift assembly having a strengthened box-shaped base configuration to resist moment bending of the side and base supports during lifting;

Still other objects will become evident from the specification drawings and claims.

DRAWINGS

The invention is described in greater detail by reference to the drawings in which.

SUMMARY

In accordance with the preferred embodiment of invention, the wheelchair lift is a significant improvement over currently available dual hydraulic, parallelogram arm type wheelchair lifts.

The wheelchair lift generally comprises a platform, a pair of parallelogram linkages, and a base assembly. Each parallelogram linkage further comprises a pair of arms which are each connected at an inboard end at the base support to define a base link and are further connected at their outboard ends by an end link, which, in turn, is pivotally connected at a bottom end underneath one edge of the platform. The end links are moved from a generally downward position to a stored vertically upward position by a pair of "pull" type hydraulic cylinders, each of which connects the lower outboard corner of each parallelogram linkage to the upper inboard corner of each parallelogram linkage. This diagonal pull is opposite the prior art push configuration.

The "pull" type hydraulic cylinders provide for smoother and more positive lift operation than conventional "push" type hydraulic cylinders, since pull-type cylinders are self-centering. That is, pull-type cylinders find their true pulling centers during power lift operation, so that the alignment of each parallelogram linkage is properly maintained. Thus, binding and premature pivot pin wear of all the moving parts of the parallelogram linkages is significantly reduced. As binding is reduced, jerky motion is virtually eliminated.

The "pull" type hydraulic cylinders also are self air bleeding during gravity down operation since the cylinders are always oriented air side up such that their flow compensators are adjacent the upper elevational end of the confined volume of the cylinder. Any air trapped within the confined volume is removed during gravity down operation, since during gravity down motion the cylinder contents are expressed through the flow compensators to the pump reservoir which is vented off to the ambient atmosphere. Removal of air from the confined volume significantly reduces spongy operation of the hydraulic cylinders and permits synchronous parallelogram linkage movement.

The "pull" type hydraulic cylinders also significantly reduce the amount of side loading placed on the seals of the piston head and pivot pin connectors of the parallelogram linkages, thereby reducing the problems of drift (where hydraulic fluid seeps past the seals during storage in the vertical position) and premature elongation wear of the pivot pins.

The base assembly of the wheelchair lift is improved by the addition of a box-type construction to provide additional strength to the base assembly to resist moment-induced bending of the base assembly and side-to-side movement of the spaced-apart side supports. The side supports are also anchored to corresponding vehicle post members disposed adjacent the vehicle opening in which the wheelchair lift assembly is mounted to further assist in reducing sway or movement of the side members of the base assembly.

The lift position sensing mechanism includes an extension finger and trip bolt assembly mounted on one of the lower arms. The trip bolt engages fingers of trip switches adjustably mounted in arcuate slots in the base. Thus, as compared to the prior art where two cams are mounted on an active push-type cylinder cross-pin, there is less bushing wear and elongation, minimizing cam drift (rotational misalignment due to wear or active cylinder movement) and lift level mispositioning.

Detailed Description of the Best Mode

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Figures 3, 4, 5:
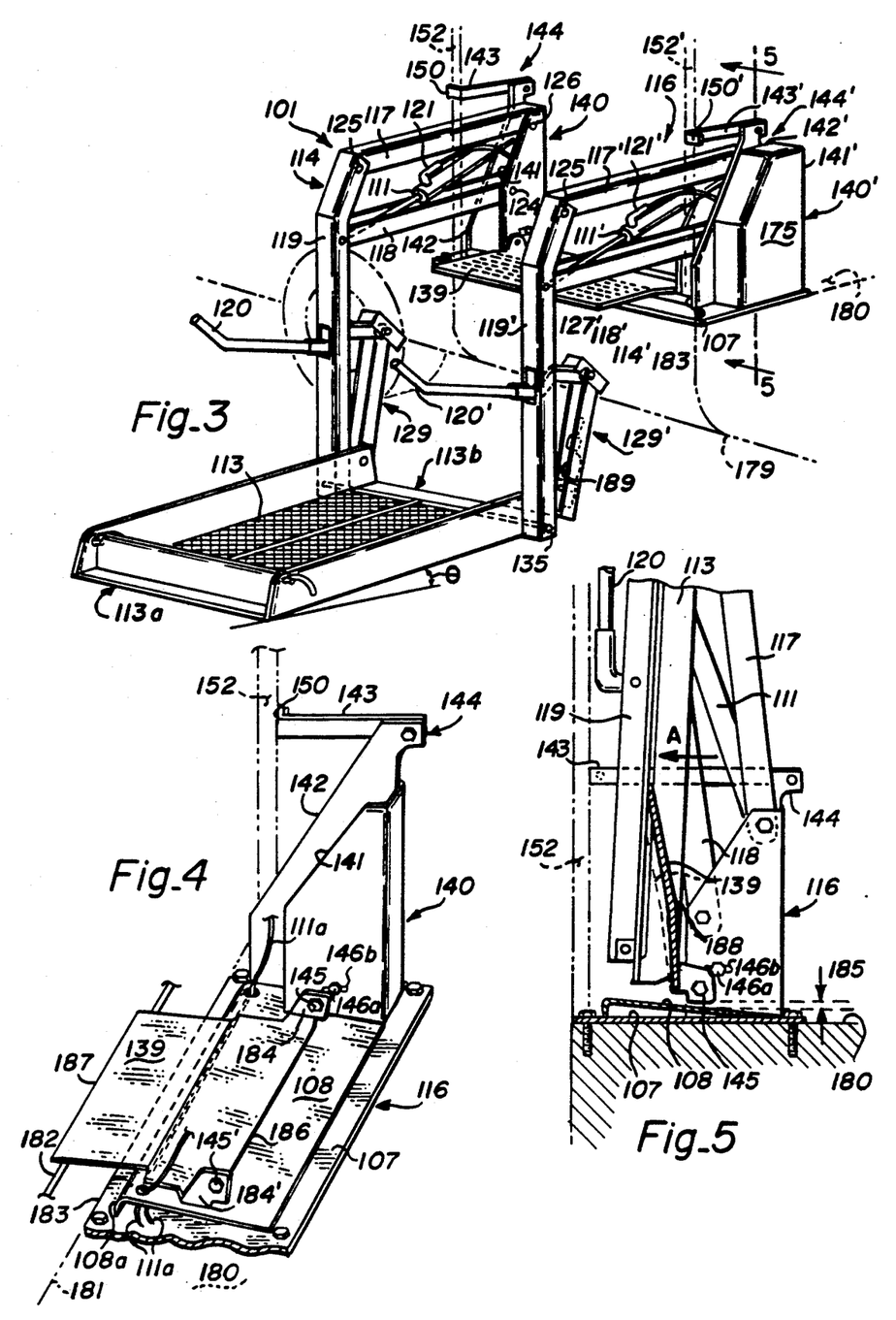
FIG. 3 is an isometric view of the improved wheel chair lift of the present invention.
FIG. 4 is an enlarged fragmentary isometric view of the base portion of the lift assembly of FIG. 3 showing the detail of the bridgeplate and box base construction.
FIG. 5 is an enlarged fragmentary side elevation view in partial cross section of the base portion of the lift assembly taken along the line and in the direction of the arrows 5—5 of FIG. 3, but when the lift of FIG. 3 has been raised to the fully upward (stowed) position.

FIG. 3 shows an improved dual hydraulic, parallelogram arm wheelchair lift constructed in accordance with one embodiment of the present invention mounted within side door access of a vehicle body 179 and generally designated by the reference numeral 101.

Figures 6A, 6B, 6C:
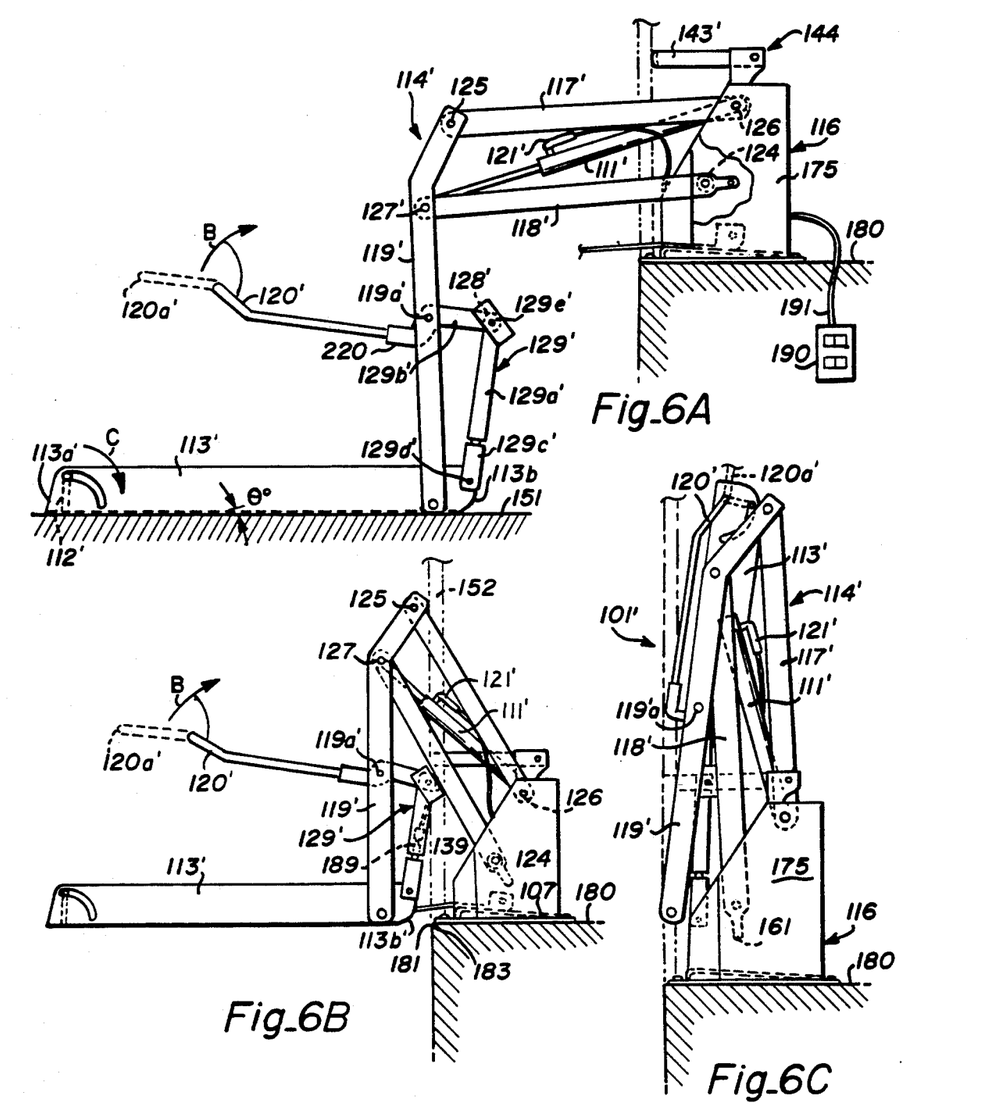
FIGS. 6A-6B is a series view in side elevation of the wheelchair lift of FIG. 3 showing the three distinct operating positions: lowered (FIG. 6A), transfer (FIG. 6B), and stowed (FIG. 6C)

The lift 101 generally comprises a platform 113, a pair of parallelogram linkage assemblies or linkages 114, 114', a base assembly 116 including mounting plate 107 for securing the lift 101 to the transit vehicle floor inside the vehicle, and a pair of one way or single-acting hydraulic cylinders 111, 111' disposed within each parallelogram linkage assembly 114, 114', respectively. The single-acting hydraulic cylinders 111, 111' are of the pull-type "power up" and "gravity down" type. That is, they are powered to move the parallelogram linkages from a fully lowered position (as shown) to an intermediate transfer position where the platform 113 is even with the vehicle floor 180 (FIG. 6B), and finally to an upright storage position where the platform 113 is folded generally vertically upward (FIG. 6C). They are operated "gravity down" by the release of a standard valve member disposed adjacent the pump reservoir to permit the controlled release of fluid from the working side of the cylinder thereby unfolding the platform and lowering the linkages from the vertical stored position to the lowered position. In the preferred embodiments the pump reservoir is vented to the ambient atmosphere so that any air contained within the hydraulic line is expelled therefrom during gravity down operation.

Each parallelogram linkage assembly 114, 114' further comprises upper arm 117, 117' and lower arm 118, 118', an end link 119, 119' and a base-mounted bracket member or side support assembly 140, 140' which serves as a base link for arms 117, 117' and 118, 118'. A lower portion of each end link 119 and 119' is provided with an articulated lever assembly 129, 129' having a pivoting elbow member 128, 128' which is caused to abut against a bottom surface of lower arm 118, 118' at about the intermediate transfer position of the lifting cycle to permit folding of the platform 113 into the storage position upon the continuation of the upward movement of the parallelogram linkages in accordance with known power-up platform storage folding techniques. The platform 113 is pivotally connected to the end links 119, 119' at pivot 135 preferably located below the surface of the platform 113 (FIG. 3).

The components of the parallelogram linkages 114, 114' (arms 117/117', 118/118' and end links 119/119') are preferably constructed of strong carbon steel channels each having a U-shaped cross section. As in prior art designs, the side edges of the end link U-channels 119, 119' and side supports 140, 140' (base links) are spaced a sufficient width apart to permit receiving (nesting) of the ends of the arms 117/117' and 118/118'. The parts are secured with bushings as described in more detail below. The single-action hydraulic cylinders 111/111' are pin connected diagonally to opposed corners of the parallelogram linkages 114 114', and are oriented with the base end of each cylinders 111, 111' connected via pins 126 in the base 116 (FIG. 6A) and the rod end of each cylinder connected at pins 127/127' through apertures in end links 119.

An important improvement of the invention over prior-art designs is the use of "pull" type single-acting hydraulic cylinders 111/111' rather than the "push" type, single-acting, hydraulic cylinders typically used in both truck and wheelchair hydraulic lift designs. A "pull" type hydraulic cylinder is distinguishable from a "push" type hydraulic cylinder by the positioning of the piston rod with respect to the cylinder body during pressurization and the side on which the hydraulic fluid acts during lift.

As is best seen in FIGS. 3 and 6A–6C, each "pull" type hydraulic cylinder 111/111' is pressurized by introducing hydraulic fluid through a flow compensator 121/121' which is disposed at the rod end of the cylinder 111/111' while the piston rod is fully extended. Note, the confined "working" volume of the "pull" type cylinder includes the piston rod, that is, the hydraulic fluid is working against a piston head surface area that is annular rather than a solid circle (as is the case with "push" type cylinders). It should be noted that in view of the decrease in piston head surface area, a greater system fluid pressure is required for "pull" type hydraulic cylinders to achieve the same cylinder force rates as the "push" type hydraulic cylinders. This is not a problem, since the lifting requirements placed on the cylinders in this system are never severe enough to make a significant difference.

When the platform 113 is in the lowered position (see FIGS. 3 and 6A) the piston rod is at full extension from upper right rear to lower left front of the parallelogram. When the platform 113 is in the folded stowed position (see FIG. 6C) the rod is fully retracted within the cylinder 111/111'. Pressurization on the rod side of the piston head moves the piston rod from its extended position FIGS. 3 and 6A, into its retracted position within the cylinder FIG. 6C. Thus, each parallelogram linkage 114/114' is pulled by the rod at pin connections 127/127' and this pulling force is what swings the arms 117/117', 118/118' into an upright position.

Figure 2:
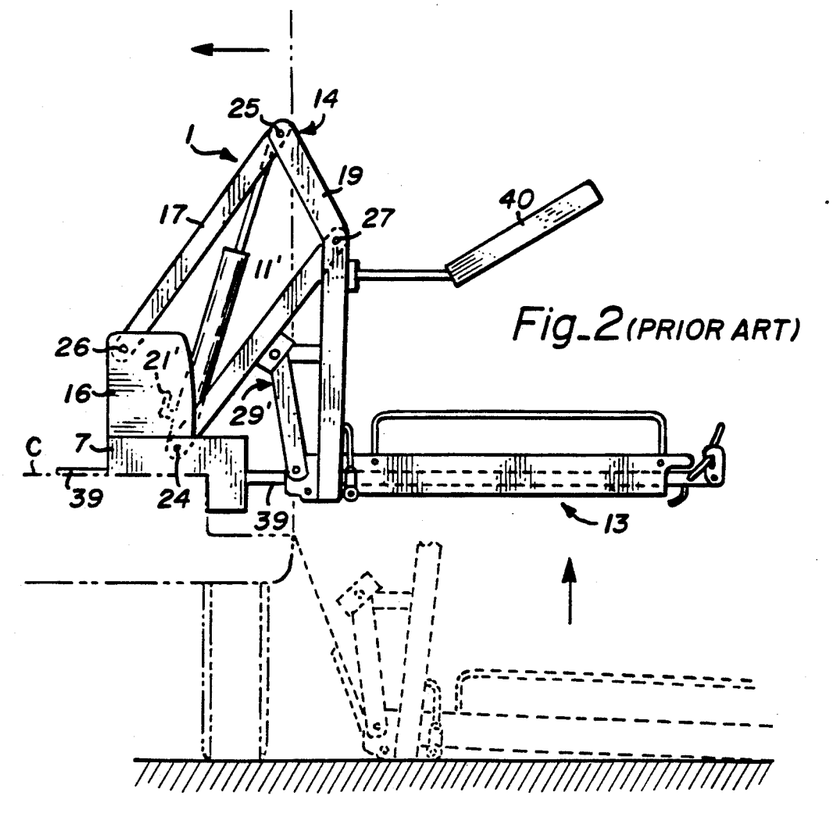
FIG. 2 is a side elevation view of a modified version of the prior art design of FIG. 1 using dual hydraulic cylinders.

In contrast, as shown in FIG. 2 a "push" type hydraulic cylinder is pressurized at the bottom or closed end of the cylinder with the piston rod being fully retracted within the cylinder in the lowered position so that the pressurization pushes the rod into its extended position. In the case of a dual hydraulic, parallelogram arm lift, full piston rod extension corresponds to the vertically upright stowed position of the lift.

Use of a "pull" type hydraulic cylinder in the manner as shown in the present invention eliminates many problems associated with "push" type cylinders and also achieves many desirable results, including improved, more positive cylinder operation, truer synchronous arm action through improved alignment of the parallelogram linkages, and a significant decrease in the problem of platform "drift", wherein "drift" is defined as the unfolding of the platform from the stowed position due to hydraulic fluid seeping by the seals of the piston head during periods of inactivity.

The improvements which comprise the embodiment of FIGS. 3–8 are better understood by a comparison to the closest prior art dual parallelogram hydraulic wheelchair lifts.

Figure 1:
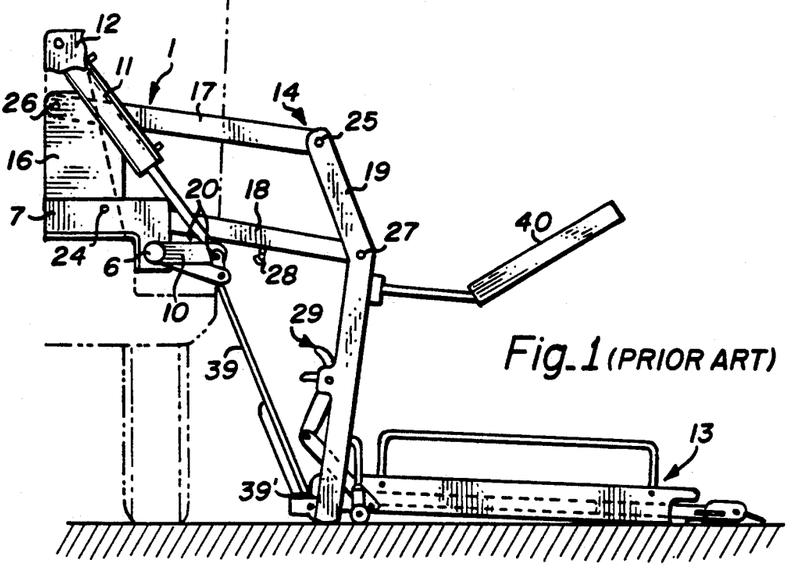
FIG. 1 is a side elevation view of a first prior art dual parallelogram arm hydraulic wheelchair lift of the type using a single, side mounted, double-acting hydraulic cylinder.

FIGS. 1–2 show examples of prior art dual arm parallelogram hydraulic wheelchair lifts. The lift 1 of FIG. 1 is described in the Savaria patent No. 4,534,450 and generally comprises a platform 13, a pair of parallelogram linkages 14 each including arms 17, 18, end links 19 and base link 16, a mounting plate 7, and a single side-mounted, double-acting hydraulic cylinder 11.

The double-acting, power-up/power-down hydraulic cylinder 11 is pivotally connected to a separate bracket plate 12 at its upper base end and to a radial lever arm 10 at its other, rod end. The radial lever arm 10 is linked to a transverse shaft 6 which, by means of an articulated linkage 20, imparts the up and down lifting motion to the parallelogram linkages 14. The lower portion of each end link 19 is also provided with a complicated spring-biased articulated assembly 29 which cooperates with a stop member 28 disposed along the underside of each lower arm 18 to upwardly fold the platform 13 in the storage position upon a continuation of linkage movement from an intermediate transfer position to the stored position of the lift. The hydraulic cylinder does not rotate to a base down position during elevation and stowage of the lift.

FIG. 2 shows a second generation design of the wheelchair lift 1 of FIG. 1 wherein the single, double-acting hydraulic cylinder 11 of FIG. 1 is replaced by a pair of single-acting hydraulic cylinders 11', each of which is disposed internally within the channel members of each parallelogram linkage 14. For ease of understanding, the reference numerals designating similar structural elements in FIGS. 1 and 2 remain the same and different elements are so indicated by a prime symbol. The lifts shown in FIGS. 1-2 each include a bridge-plate 39, 39' and an arm rest 40 having a control unit placed along an outboard end thereof.

The lift 1' of FIG. 2 is representative of a currently commercially available wheelchair lift design called the Model R2000 manufactured by the Ricon Corporation of Pacoima, CA. Each single-acting hydraulic cylinder 11' is a base-down "push" type cylinder with the fluid acting on the piston side. The lift 1' is shown in the intermediate transfer position where the rod is partially extended outward from the cylinder 11' and the platform 13 is substantially horizontally aligned with the vehicle floor 15. Note that the "push" type hydraulic cylinder 11' is further defined as forming the connection of the pins (24, 25) corresponding to the short diagonal of the parallelogram (i.e., rod is retracted) when the lift is in the fully lowered position and as forming the connection of the long diagonal of the parallelogram (i.e., rod is extended) when the lift is in the upright, stored position.

As noted above, a principle concern of handicapped persons is a smooth, predictable, and non-jerky operation of the wheelchair lift. A common problem of dual arm, parallelogram, dual hydraulic wheelchair lifts is the uneven and jerky movement of the lift when the linkages operate out of sync. For example, in the prior art lift of FIG. 2, the spaced-apart parallelogram arm linkage assemblies 14 become misaligned with respect to one another in their parallel transverse planes of arc-like movement when air leaks into the confined volume of the two different cylinders. Asynchronous or non-uniform movement of the parallelogram linkages causes binding to occur and this results in the jerky lift operation. Since the handicap user is on a rolling chair as a suspended and moveable weight on the platform, the jerks can cause movement of the chair and fear and confusion in the user. Alignment and binding problems only worsen over numerous cycling of the lift arms. Eventually, the microswitch operation is adversely affected and the precise control of the stop locations of the platform for the load, transfer and fold up positions deteriorates or is lost.

In the prior art wheelchair lift design of FIG. 1 further alignment and binding problems of the linkages 19 are attributed in part by the torque induced angular displacement experienced by the transverse shaft 6 when subjected to rotational movement through use of the side-mounted single hydraulic cylinder 11.

A principle advantage of using "pull" type hydraulic cylinders of this invention, as opposed to "push" type hydraulic cylinders is improved alignment of the component parts of the parallelogram linkages. The pulling action of the piston rod of each hydraulic cylinder 111, 111' of the present invention finds a true center with respect to the pivot points of the parallelogram linkages 119. The side loading on the pivot pin bushings is significantly reduced as compared to a pushing action. An analogy here is helpful in explaining this principle. Imagine that the piston rod of the hydraulic cylinder 111 is a rope. A rope under tension (pull) quickly finds its true center, while a rope in compression will buckle, or if sufficiently rigid, will tend to veer from its center line. Thus, as can be seen in both FIGS. 1 and 2 the pushing action of the hydraulic cylinders 11 and 11' exert unnecessary side loads on the pivot pins 24-26 of the parallelogram linkages 19.

It has been found that the bushings in association with the pivot pins of these prior art wheelchair lift designs prematurely wear and become elongated (oval), thus requiring frequent replacement. The bushing replacement is labor intensive as the pin connectors are normally welded in place. Need for this type of repair is significantly reduced by using "pull" type hydraulic cylinders which are held in place by threaded bolts.

Another benefit of using "pull" type hydraulic cylinders 111 in combination with the dual hydraulic, parallelogram arm wheelchair lifts is the self air-bleeding feature of the cylinders. As is best seen in FIG. 6C, the flow compensator 121 is at the upper-most elevation of the confined volume of the cylinder 111. As is standard for gravity down operation of a single-action hydraulic cylinder, a relief or check valve (not shown) is released adjacent the pump reservoir (concealed within housing 175). This permits the weight of the wheelchair lift to express the hydraulic fluid contained within the confined volume of the hydraulic cylinder through its flow compensator element 121 (gravity effect). Any air trapped at the upper end (flow-compensator end) within the confined volume of the hydraulic cylinder 111 will accumulate at the highest elevational point within the cylinder volume since air is lighter than the hydraulic fluid. Thus, when the wheelchair lift 101 is moved by gravity down operation from the upright stored position to the lowered position, the piston head forces all the air trapped at the top of the cylinder through the flow compensator 121 into the fluid reservoir which is then vented off to the atmosphere.

The hydraulic system is now free of air which permits more positive cylinder operation. This is a significant improvement over the "spongy" or jerky cylinder operation commonly associated with "push" type hydraulic cylinders since air remains trapped against the piston and above the flow compensator in the "push" type cylinders during gravity down operation. .Gravity down operation of this invention is smoother and results in the platform 113 being lowered evenly until it contacts the ground 150 (see FIG. 6A). Thus, every time the lift is lowered to take on a handicapped wheelchair user, the cylinder is purged of any accumulated air.

To assist in the lowering operation and insure a minimum on-ramp transition hump, the platform is held in a slight downward tilt on the order of 1°-3° during gravity down operation movement so that the outboard end portion 113a of the platform 113 contacts the ground before the inboard end portion 113b. As shown in FIGS. 3 and 6A, the angle $\theta$ represents the 1° to 3° downward tilt of the platform 113. This downward tilt is the result of a slight offset incorporated into the open or outboard ends of the arms 117/117' and 118/118'. That is, the arms are not in true parallel relationship but are rather offset by 1° to 3° at their outboard ends. This offset from parallel results in the desired downward tilt of the platform. It results in the arm 119 being non-vertical, canted inwardly (toward the vehicle) at the base as best seen in FIG. 6A.

Since the seals of the piston head within the hydraulic cylinder 111 are not subjected to excessive side loading due to true center pulling action of the "pull" type cylinders, the seals have a longer life expectancy and thus perform better in preventing air and hydraulic fluid from seeping past the seals. This reduces the problems associated with platform drift. An additional benefit of this arrangement is that the piston rod is fully retracted inside the cylinder during non-use (i.e., the stowed position). The hydraulic fluid provides a lubricating effect for the rod and thus inhibits corrosion. In contrast to a "push" type cylinder, the rod is not exposed or subjected to the corrosive effects of weather during non-use and thus fewer contaminants are permitted to enter into the confined volume of the hydraulic cylinder 111, thus ensuring the integrity of the sealing members.

Another improvement of the present invention lies in the design of the strengthened base assembly 116. This is best seen in FIGS. 3-5. The base assembly 116 comprises a mounting plate 107, a support plate 108, a pivotable bridgeplate 139, and a pair of upstanding, spaced-apart side supports 140/140'. Each side support 140/140' further comprises an inner housing plate 141 and an outer housing plate 142 spaced therefrom, which together serve as the base link for arms 117, 117' and 118, 118' of each parallelogram linkage 114 and 114'.

A problem with prior art wheelchair lift designs having an open mounting structure (wherein an "open mounting structure" is defined as a frame lacking a top structural cross member linking the spaced-apart side supports; contrast this open structure to a "closed structure" such as top cross member 50 in Deacon U.S. Pat. No. Re. 31,178) was the tendency of the side supports (i.e., the side supports 140 of the present invention) to bend toward the platform and sway from side-to-side when the platform 113 was loaded. As best seen in FIG. 4, this problem is overcome in part by the provision of tie down members 143, 143' which connect a top flange portion 144, 144' of each side support 140, 140' to a corresponding vehicle post or structural member 152, 152' of the vehicle door opening (not shown) at the outboard end 150/150'. The tie down members 143, 143' limit the outboard-to-inboard sway movement and reduce the side-to-side movement of the side supports 140, 140' when the platform 113 is under load.

Another improvement of the base assembly 116 is the addition of the reverse ramp support plate 108 to the mounting plate 107. As is best seen in FIGS. 4 and 5, the support plate 108 includes a lip 108a at its outboard end (hence, the term reverse ramp, the plate sloping downward from outboard to inboard, not vice versa). This provides a box construction to the base assembly 116 which yields at least a two-fold strength increase over a standard flat mounting base assembly and substantially reduces moment-induced bending. The lip 108a is preferably on the order of ⅜" in height so that it conforms to suggested platform stepover guidelines for wheelchair access, such as those proposed by the Society of Automotive Engineers (SAE). The vertical rise of the support plate 108 also permits convenient out-of-the-way internal routing of hydraulic lines 111a. The support plate 108 may be securely attached to the mounting plate 107 by any number of known securing methods, and is preferably provided with a number of tangs along its leading edge, which cooperate with matching relieved grooves or holes disposed in the top surface of the mounting plate 107 and are welded in place. The bridgeplate 139 is pivotally connected at each side to the inner housing 141 at pivots 145. A horizontally adjustable stop nut & bolt 146a in slot 146b is also provided to limit the backward travel of the stored upward pivot motion of the bridgeplate 139 as the platform 113 is moved to the upright stored position.

As is seen in FIG. 5, the stop may be adjusted to provide a spring bias to the bridgeplate 139 (arcuate deformity of the bridgeplate is shown in phantom as 139') so that upon gravity down operation, the bridgeplate acts as a wide leaf spring to bias the platform to unfold (see Arrow A in FIG. 5). The adjustable stop also provides a way of retaining the bridgeplate 139 against the platform 113 (during storage) without having to provide a catch or latch on the platform face 113a which could interfere with the wheels of the wheelchair when rolled onto and off the platform 113, or interfere with loading boxes via the platform.

Referring to the series view shown in FIGS. 6A-6C, the operation of the wheelchair lift will now be described. While the lift is in the ground load position of FIG. 6A, the wheelchair user rolls onto the platform 113 at the outboard end 113a by overcoming spring biased inward pivoting safety stop 112 see arrow C). While only the right side parallelogram linkage 114' is visible in the series of side elevation views in FIGS. 6A-6C, reference to coordinate elements of left side parallelogram linkage 114 is included for completeness in the following description. Each end link 119/119', is provided with an arm rest 120/120', which are utilized by the wheelchair user for auxiliary support during lifting. The arm rests 120/120', are pivotally connected to the end links 119/119', at pivots 119a/119'a, and are further coupled with the articulated lever assembly 129/129', so that as the platform is caused to tilt upward during folding, the arm rests 120/120' pivot to close as shown by the direction of arrow B. The closed position is shown in FIGS. 5 and 6C. FIGS. 6A-6C also show an alternate embodiment for the arm rest 120' as seen by extension 120a' shown in phantom.

Note that in the lift of this type, the inboard end 113b (see FIG. 6B) of lift platform 113, does not approach closely to the floor lip 181 or outboard edge 183 of the baseplate 107 due to the limiting geometry of the parallelogram where the base link assembly 116 has the pivots 124, 126 elevated above the floor level 180. Thus, a substantial bridgeplate to cover the 8-10" or more gap between platform end 113b and inboard vehicle edge(s) 181, 183 is required. In this invention the bridgeplate serves the dual function of a self storable bridgeplate as well as providing the spring bias gravity down assist.

Note that since the bridgeplate 139 is pivoted on opposed upstanding rearward inboard side flanges 184, 184' (FIG. 4), a sufficient gap 185 (see FIG. 5) is created when the lift is raised so that any dirt or stones are self-clearing. This gap also permits easy sweeping of the interior of the vehicle. In prior art lifts the inboard edge 186 (FIG. 4) of the bridgeplate is hinged to the mounting plate 107 (there is no box girder-forming support plate 108) which permits dirt and stones to become wedged between the bridgeplate and the mounting plate. The outboard edge 117 in that prior art construction may no longer rest on the platform and the hinge can become sprung. Then the cams must be readjusted to raise the transfer level above the floor level, or else a physical barrier to wheelchair entry is created. In the present invention, pivoting the bridgeplate above the mounting plate and providing the downward bend 188 (FIGS. 4 and 5) permits the plate to rest on the top surface 113a of the lift and to follow it arcuately through a portion of its upward/downward motion so that vertical adjustment of the platform surface 113a with respect to the vehicle floor 180 is less critical. This is a very significant advantage.

As is clearly seen in FIGS. 6A-6B, access to the flow compensator 121 of the hydraulic cylinders 111 is unobstructed during all positions of the wheelchair lift. This permits the flow compensators 121/121' to be easily serviced. This is also an added benefit particular to "pull" type hydraulic cylinders. For comparison of the relative inaccessibility of the flow compensators 21' associated with "push" type hydraulic cylinders 11', see the prior art example of FIG. 2.

Figures 7, 8:
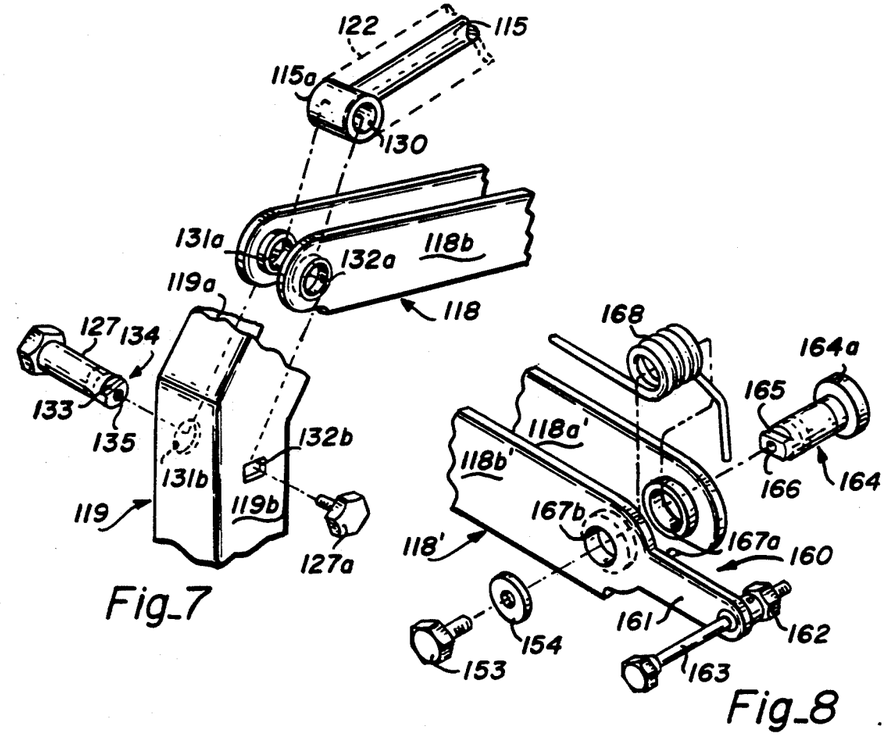
FIG. 7 is an enlarged fragmentary isometric view of a load bearing arm and end link connector pin assembly.
FIG. 8 is an enlarged fragmentary perspective view of the micro-switch trigger pin assembly.

FIG. 7 shows an exploded isometric view of a preferred pin coupling assembly for pivot pins 124 through 127. For reasons of brevity, only the pivot pin 127 which connects the lower arm 118 to the end link 119 will be explained in detail. To construct the pivot pin assembly of FIG. 7, the rod end portion 115 is first inserted within the side walls of U-channel lower arm 118, having its transverse bore hole 130 (including a bushing) axially aligned with holes 131a and 132a, provided in the vertical side walls of arm 118. The pin 127 is then inserted through coaligned holes 131a and 131b, bore 130 and holes 132a and 132b with the flats 133 of projection 134 engaging corresponding flat portions of hole 132b. A threaded bolt 127a is then screwed in and tightened within the corresponding threaded bore hole 135.

This pivot pin arrangement provides for an improved bearing surface area over prior art pivot pin designs used in dual hydraulic, parallelogram arm wheelchair lifts, since the total bearing surface area is increased significantly. In the prior art pivot pin designs, premature wear and elongation of the pivot pin bushings was common since the pins 24, 25 were fixed with respect to the cylinder 11, 11' and the bearing surface was limited to the surface area of each circular hole provided in opposing vertical side walls of the arm channels 18. That is, the pin rotated in the arm channel holes. In this invention, since pin 127 cannot turn in holes 131, 132 by virtue of flats 133, the bearing surface is the full length of the pin in the rod end transverse bearing member 115a.

Since bushing elongation is also due in part to the side loading on the pivot pin, use of "pull" type hydraulic cylinders in combination with the improved pivot pin assembly of FIG. 7 results in a significant reduction in binding and insures proper alignment of the parallelogram linkages. This, in turn, provides for smoother operation of the wheelchair lift. It is understood that, while the pivot pin assembly described above is directed to the connection of a rod end portion 115 of the hydraulic cylinder to a pivot point, the assembly is similar for a base end portion 122 (shown in phantom) of the hydraulic cylinder 111. Also, the improved pivot pins may also be used for the non-load-bearing pins 124 and 125.

Figure 9:
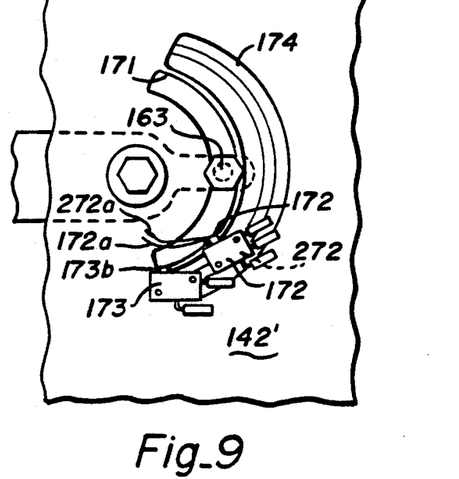
FIG. 9 shows in fragmentary side elevation the operation of the trigger pin and microswitches.
Figure 10:
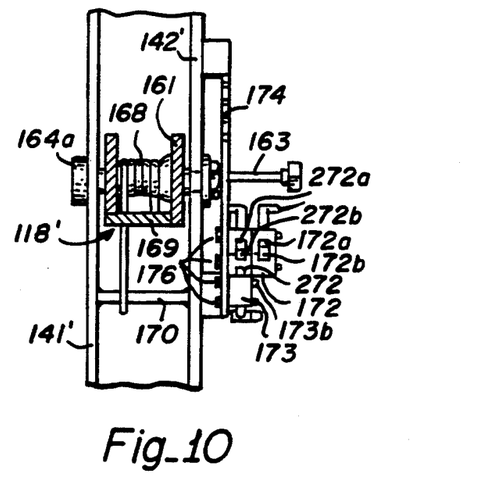
FIG. 10 shows a front elevation of the mounting of the microswitches on the stand-off and how the trigger pin contacts the wands.

FIGS. 6A and 8-10 show one embodiment for a microswitch trigger assembly that does not rely on the usual cams, which cams are prone to misalignment and floating as the pins on which they ride wear in view of their association with the hydraulic cylinder base. The inboard ends of lower arms 118/118' are pivotally connected between the upstanding inner and outer housing walls 141/141', 142/142' of the base assembly 116 (see FIGS. 3 and 4). The pin connector 164 for this lower arm inboard pivot is similar to the parallelogram linkage pivot pins 127 (FIG. 7) with the pin 164 inserted within holes 167a and 167b of lower arm sidewalls 118a and 118b, respectively, in a manner similar to the above described pin assembly shown in FIG. 7 so that flats 165 of extended end 166 extend therethrough and engage a flat sided hole (like 132b in FIG. 7) inside plate 142' (see FIG. 9). Spring 168 has one end restrained by the base 169 of the lower arm channel 118'; and the other end restrained by a second stop 170 associated with housing wall of the right side support 140' (see FIG. 10). Once the arm 118' has been inserted within inner and outer housings 141', 142' of the right side support 140' and the ends of the pin 164 have been inserted within corresponding holes 167a and 167b of arm 118', the threaded nut 153 and washer 154 are secured to the extended end 166 of the pin 164 thus fixing arm 118' within inner and outer housing plates 141', 142' of side support 140' (housing 141', 142' and side support 140' are omitted in FIG. 8 for clarity, but are shown in FIG. 10).

Either left or right lower pivot arm 118 or 118' may be designated as the trigger pin, but preferably neither is associated with a hydraulic cylinder pivot pin. The microswitch trigger assembly 160 comprises a fingerlike extension 161 of the outside upstanding wall of the arm 118'.

As best seen in FIGS. 8 and 9, trigger bolt 163 is secured by a threaded nut 162 adjacent the inboard end of extension 161. This bolt extends through arcuate slot 171 in outboard wall 142' where it contacts the lever arms 172a, 272a of microswitches 172, 272 which are adjustably mounted side by side along a slotted arcuate stand-off 174 by appropriate nut and bolt assemblies 176.

Adjustment of the two side by side mounted microswitches 172, 272 and the third bottom microswitch 173 is easily accomplished by loosening the nuts 176 and adjusting the microswitch position along the arc, and the angle of the inclination from the horizontal, such that when the bolt surface strikes the microswitch lever arms 172a, 272a, the corresponding microswitch buttons 172b, 272b and 173b are tripped at the proper orientation of the lift. The nuts 176 are then retightened. It is evident that precise positional control is achieved by the length of the lever arm extension magnifying the arcuate travel of the lift. This is an important feature as it permits easy field service simply by removing outer housing plate 175 to access the microswitches. Note the microswitch wands or lever arms are generally tangential to the travel arc of the trigger bolt. This provides more vertical reciprocation action on the microswitch buttons, thus lessening wear and false triggering. As is seen in FIG. 6C, an additional housing 175 is provided to enclose the microswitch assembly as well as the hydraulic pump and fluid reservoir (not shown).

Figure 12:
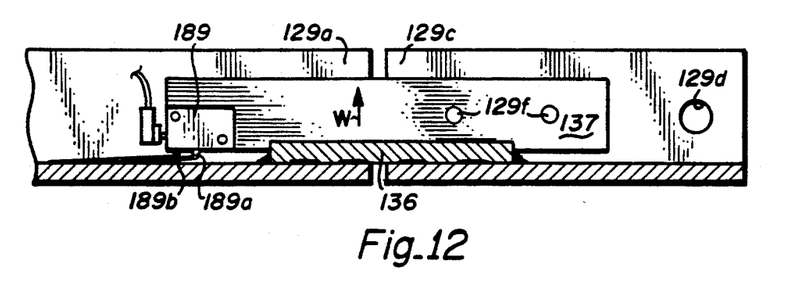
FIG. 12 is an elevation view, partly in section of the mounting of the load lock switch in the sliding shoe arm.

Additionally, a load sensing "disable" switch can be provided in one of the articulated lever assemblies 129 so that the platform cannot fold closed (stowed) if there is more than a given weight (say 30–80 lbs) on the platform. FIG. 12 discloses an example of a load interlock switch 189 disposed within a first fore arm portion 129a of one of the articulated lever assemblies 129. The platform end is to the right in FIG. 12, but is not shown. The load interlock switch is shown in its normally closed (N.C.) position and is mounted on flex arm 137 which is pinned (e.g., bolted as at 129f) to a second fore arm portion 129c. A bridge plate 136 connects the two fore arm portions 129a and 129c together. When a load to N.O. by the weight and the "fold" rocker switch is disabled until the load is safely removed (see discussion of FIG. 12 above).

The state table below summarizes the operation of the lift and the state changes for the microswitches 172, 173 and 272 during movement of the lift from the stowed, vertically upright position to the intermediate transfer level (vehicle floor level) to the ground level, and back.

STATE TABLE

Figure 11:
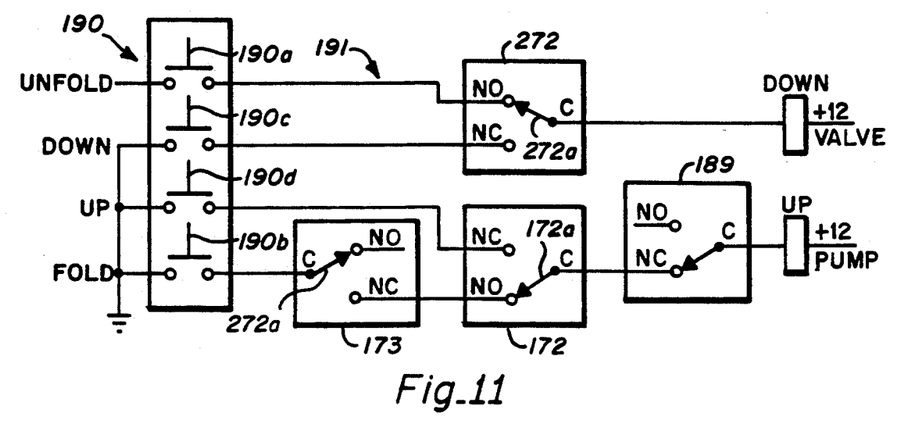
FIG. 11 is a schematic electrical diagram of the microswitch controls.

| CONDITION (lift position) | MICRO-SWITCH 173 | MICRO-SWITCH 272 | MICRO-SWITCH 172 | COMMENTS |
|---|---|---|---|---|
| 1. Lift initially in fully stowed position (folded vertically upright). | N.O. | N.O. | N.O. | All microswtiches set to N.O. state (This is shown in FIG. 11) |
| 2. At stowed position: Unfold button 190a is depressed to begin unfolding lift to intermediate transfer level. | N.O. ↓ N.C. | N.O. ↓ N.C. | N.O. | Down solenoid valve is activated, Microswitch 173 changes state to N.C. within about the first inch of platform travel; Microswitch 272 changes state at transfer level. |
| 3. At transfer level: Down button 190d is depressed to lower platform horizontally to ground level. | N.C. | N.C. | N.O. ↓ N.C. | Microswitch 172 becomes active (chgs. state to N.C. within about the first inch of platform travel downward; This arms the "up" movement for future use. The "down" solenoid valve is not affected. |
| 4. At ground level: Up button 190d depressed to raise lift horizontally to transfer level. | N.C. | N.C. | N.C. ↓ ↓ N.O. | Up solenoid is activated to operate the pump to begin lifting. Microswitch 172 changes state to N.O. when lift reaches transfer level; up solenoid deactivated. |
| 5. At transfer level Fold button 190b depressed to fold lift to fully stowed vertically upright position. | N.C. ↓ N.O. | N.C. ↓ N.O. | N.O. | Microswitch 272 changes state to N.O. within first inch of platform travel; Microswitch 173 changes state to N.O. at stowed, vertically upright position; This shuts off the circuit. |
| 6. Lift in fully stowed vertically upright position. | N.O. | N.O. | N.O. | Lift is now ready for unfold operation. | of sufficient weight is present on the lift, flex arm 137 moved relative to arm portion 129a in the direction of Arrow W, thus increasing pressure of wand 189a tripping button 189b of the load interlockswitch to the N.O. position. This causes a discontinuity in the pump solenoid circuit which interrupts platform operation.

As shown in FIGS. 10 and 11, it is preferred to use dual microswitches 172, 272, i.e., two side-by-side microswitches, each having a simple wand 172a, 272a and buttons, 172b, 272b, one normally open (N.O.) and one normally closed (N.C.) to accommodate the fact that the lift is reversible in its up-down cycle. FIG. 11 shows a schematic diagram of the microswitch wiring to the umbilical control box 190 via cable 191 (FIG. 6A) and the 12V power source, with the switch contacts shown when the lift is in the upper stowed position. As the rocker switch box is toggled to the "unfold" position (i.e., button 190a is depressed or "rocked" one way), the hydraulic valve solenoid is released and the pressure of the platform bridge plate 139, arm spring 168 and springs associated with pivot pins 124, 127 and 129e (not shown) pop the lift open past vertical dead center and the lift descends to the transfer level by gravity. As the trigger pin 163 moves arcuately upward it releases, in turn, first the wand of microswitch 173 and then both wands of microswitches 172, 272. The contacts on the upper inner and outer microswitches 172, 272 are spring biased by release of the wand to N.C. Now, the "Down" rocker switch can be activated (i.e., depression of down button 190c), permitting the lift to descend to ground level by gravity for loading. Upon loading, the switching is reversed, with power "up" (up button 190d depressed to activate the pump solenoid), followed by power "fold" (fold button 190b depressed) after unloading at the transfer level, if the load interlock switch 189 remains N.C., indicating no load is on the lift. If there is a load on the lift the load interlock switch 189 is opened It should be understood that various modifications within the scope of this invention can be made by one of ordinary skill in the art without departing from the spirit thereof. For example, the lift of this invention is shown as attendant controlled via box 190 (having up-/down fold/unfold dip switches) on umbilical cable 191. This is the preferred configuration for a transit vehicle. However, appropriate controls may be located on arm 120, on housing 175, adjacent the vehicle driving controls or in a lockable panel on the exterior of the vehicle as needed or desired. I therefore wish my invention to be defined by the scope of the appended claims in view of the specification as broadly as the prior art will permit.

I claim:

1. In a wheelchair lift having a dual, parallelogram-type arm lifting assembly, a platform connected to said lifting assembly moveable thereby from a first lowered level to an intermediate higher transfer level and thence rotatable to a generally vertical stowed position, and back, at least one hydraulic cylinder assembly actuating each said lifting assembly, and a base assembly for mounting said lifting assembly to a vehicle floor, the improvements comprising in operative combination therewith:

a) each said hydraulic cylinder assembly includes a single-acting hydraulic cylinder having an extendable piston rod, each said hydraulic cylinder being oriented substantially parallel to a diagonal axis across the parallelogram of said lifting assembly, said axis being a long axis when the lift is in its first lowered level and a short axis when the lift is in its stowed position;

b) said hydraulic cylinders are connected with a fluid power source to pull while lifting said platform upwardly from said lowered position by fluid pressure on a rod side of each hydraulic cylinder, and to operate gravity down;

c) each said hydraulic cylinder is oriented in the platform stowed position with the rod retracted into the cylinder;

d) each said hydraulic cylinder has a hydraulic fluid inlet-outlet located adjacent a rod inlet end thereof to provide purging of accumulating air inside said cylinder upon each gravity down portion of an operational cycle;

e) said orientation and linkage of said hydraulic cylinders improves synchronization, reduces drift and/or spongy operation, and reduces arm misalignment binding, side loading and parallelogram arm pivot pin bushing elongation;

f) each of said parallelogram arm assemblies includes a base member, an end link, and a pair of arms, each of which arm pairs is pivotally connected to said base member and said end link at opposing ends of each of said arms, said arms forming with said end link and said base member generally a parallelogram;

g) each pair of arms and end link of said parallelogram include U-channel members having spaced side walls sized for receiving a hydraulic cylinder disposed nestable therewithin;

h) at least one of said arms forming said parallelogram includes a microswitch trigger assembly provided to an inboard end thereof;

i) said microswitch trigger assembly follows the lifting movement of said parallelogram linkages and engages a plurality of microswitches at predetermined platform positions during said lifting and stowage movements; and j) said microswitch trigger assembly includes means for positioning adjustment of said microswitches both along an arcuate path and their angle of inclination with respect to horizontal adjustment settings for said microswitches.

2. An improved lift as in claim 1 wherein:
a) said base members of said parallelogram assemblies include:
   i) tie members for attachment to vehicle structural posts disposed adjacent the opening of a vehicle in which said wheelchair lift is mounted;
   ii) said arms are secured to said base members above the floor level to which said lift is to be secured; and
   iii) said arms are open by about from 1° to 3°.

3. An improved lift as in claim 2 wherein:
a) each of said tie members are pivotally connected adjacent a top end portion of each of said base members.

4. An improved lift as in claim 1 wherein:
a) said base assembly includes box construction means for resisting moment-induced bending.

5. An improved lift as in claim 4 wherein:
a) said box construction means includes a pair of spaced, generally horizontal support plates, said plate pair including a lower plate securable to the upper surface of a vehicle floor; and
b) said support plate pair includes an upper plate having at least one vertically downward lip member disposed along an outboard edge thereof to rest on said lower plate in a reverse ramp to provide said plate spacing for said box construction of said base assembly.

6. An improved lift as in claim 5 wherein:
a) said upper support plate includes at least one hole disposed along an upper surface thereof to permit convenient, out of the way routing of hydraulic fluid lines associated with said at least one hydraulic cylinder.

7. A lift as in claim 1 wherein:
a) said platform has an outboard end and an inboard end;
b) said base members are oriented vertically and mounted spaced apart on a base plate;
c) the geometry of said parallelogram arm assemblies is oriented to provide a substantial gap between said inboard end of said lift and said lift base plate when said lift is raised to the transfer level; and
d) said lift includes a bridgeplate spanning said gap;
   i) said bridgeplate has an inboard edge and an outboard edge;
   ii) said bridgeplate is pivotally secured adjacent its inboard end to each of said base members, so that it pivots upwards with the motion of said lift platform upon stowage.

8. In a dual-arm parallelogram wheelchair lift, having a platform connected to spaced, dual parallelogram arm lifting assemblies pivotably mounted to speed base members, a base plate to which base members carrying said arm assemblies are attached, and a generally rectangular bridgeplate for spanning a gap between an inboard end of the lift platform and an outboard edge of said base plate, said lifting assemblies moving said platform from a first lowered level to an intermediate higher transfer level, and thence rotating said platform to a generally vertical stowed position, and back, the improvement which comprises in operative combination therewith;

a) said base plate is generally rectangular, and has an outboard edge, an inboard edge and two side edges;
b) said bridgeplate includes means for pivotally attaching said bridgeplate to said base members adjacent said inboard edge above said base plate so that said base plate pivots upwardly upon the stowage motion of said platform; and
c) said pivotal attachment is disposed so that upon said bridgeplate pivoting upwardly a gap is provided between the now-raised inboard edge of said bridgeplate and said base plate so that debris is easily clearable from the area between the bridgeplate and the base plate.

9. An improved lift as in claim 8 wherein:
a) said base members include stop means which engage said bridge plate to limit its upward rotation before said platform is in its completely stowed position so that said bridge plate acts as a leaf spring to bias said platform open from a stowed position upon release of hydraulic pressure which closes said lift into the stowed position from the transfer position.

10. In a dual-arm hydraulic parallelogram wheelchair lift, having a platform connected to spaced, dual parallelogram arm lifting assemblies pivotally connected to spaced base members, a base plate to which said base members carrying said arm assemblies are attached, and which includes at least one hydraulic cylinder oriented diagonally across said parallelogram arm assemblies, said lifting assemblies moving said platform from a first lowered level to an intermediate higher transfer level, and thence rotating said platform to a generally vertical stowed position, and back, the improvement which comprises in operative combination therewith;
  a) said hydraulic cylinder has a longitudinal axis along which the hydraulic cylinder rod reciprocates, a base cylinder end, and a projecting rod having an external end;
  b) said base cylinder end and said external end of said rod each have a transverse bearing sleeve, and each of said sleeves have a central aperture therein for engaging a fixed pin so that said rod end and cylinder end pivots on said pins;
  c) a pair of pin members mounted in association with a parallelogram arm assembly, each pin member receivingly engaged in said bearing sleeves at the external end of said rod and at said cylinder end respectively, said pins being non-rotatably fixed with respect to the arms of said parallelogram assembly to which they are mounted; and
  d) said fixed pin providing extended bearing surface to said bearing sleeve to reduce channel hole elongation from extended use under load.

11. A lift as in claim 10 wherein said lift includes:
  a) a pair of parallelogram arm assemblies, each one of which is activated by a hydraulic cylinder;
  b) each of said arm assemblies has associated therewith two active and two passive pivots, said active pivots being receivingly engaged by said hydraulic cylinder bearing sleeves;
  c) said hydraulic cylinders are disposed nestable within channel-type arm assemblies; and
  d) each of said arm assemblies has at least one acitve and one passive pivot disposed at an inboard base link end thereof.

12. A lift as in claim 11 which includes:
  a) a microswitch trigger assembly mounted on an inboard extension of one of said arms of one of said parallelogram arm assemblies adjacent one of said passive pivots;
  b) said microswitch trigger assembly follows the lifting movement of said parallelogram linkages and triggeringly engages a plurality of microswitches, each at different predetermined platform positions during said lifting and stowage movements; and
  c) said microswitch trigger assembly includes means for positioning adjustment of each of said microswitches, both along an arcuate path and at an angle of inclination with respect to a horizontal adjustment setting for each of said microswitches.

13. A lift as in claim 12 wherein:
  a) said hydraulic cylinder assembly is single-acting and is oriented substantially parallel to a diagonal axis across the parallelogram of at least one lifting assembly, said axis being a long axis when the lift is in its first lowered level and a short axis when the lift is in its stowed position; and
  b) said hydraulic cylinder assembly is connected with a fluid power source to pull while lifting said platform upwardly from said lowered position by fluid pressure on a shaft side of the hydraulic cylinder, and to operate gravity down.

14. Method of lifting a wheelchair user with a hydraulic dual parallelogram arm wheelchair lift having a platform pivotally attached at an inboard end to a pair of spaced-apart parallelogram arm lifting assemblies, each of said assemblies including a base member, an end link and a pair of spaced arms forming with said end link and said base member generally a parallelogram, at least one of said lifting assemblies being hydraulically actuated from a first lowered level to an intermediate higher transfer level and thence rotatable to a generally vertical stowed position and back, comprising the steps of:
  a) actuating said hydraulic cylinder to pull while lifting said platform upwardly from said lowered position by fluid pressure on a shaft side of said hydraulic cylinder so that a shaft of said cylinder is substantially withdrawn into said cylinder when said lift is in its generally vertical stowed position;
  b) purging air in said hydraulic fluid which accumulates in said hydraulic cylinder upon gravity down operation of said lift during each cycle from its stowed and transfer levels to the transfer and lower levels, respectively;
  c) spreading the rotational and pulling forces from said hydraulic cylinder across large surfaces of fixed pins in the arms of said arm assemblies; and
  d) said pull, purging and force spreading steps improving synchronization, reducing drift and/or spongy operation, and reducing arm misalignment binding, said loading and parallelogram arm pivot pin bushing elongation.

15. Method of lifting as in claim 14 which includes the added step of:
  a) biasing said platform toward an unfolded position by placing a bridge plate under rotational compression as said lift platform nears its vertical stowed position.

16. Method of lifting as in claim 14 which includes the added step of:
  a) triggering microswitches to control the hydraulic fluid flow to and from said hydraulic cylinder by extending the inboard end of at least one arm to provide a member to engage said microswitches positionally adjustably disposed along an arcuate path.

17. In a wheelchair lift having dual parallelogram-type arm lifting assemblies including a base member, an end link and a pair of spaced arms each of which is pivotally connected to said base member and said end link at the ends of said arm to form generally a parallelogram, a platform connected to said lifting assemblies moveable thereby from a first lowered level to an intermediate higher transfer level and thence rotatable to a generally vertical stowed position, and back, the improvement comprising in operative combination therewith:
  a) a microswitch trigger assembly is provided to at least one inboard end of one of said arms forming said parallelogram;
  b) said microswitch trigger assembly follows the lifting movement of said parallelogram linkages and triggeringly engages a plurality of microswitches, each at different predetermined platform positions during said lifting and stowage movements; and
  c) said microswitch trigger assembly includes means for positioning adjustment of each of said microswitches, both along an arcuate path and at an angle of inclination with respect to a horizontal adjustment setting for each of said microswitches.

18. An improved lift as in claim 17 wherein:
  a) said microswitch assembly includes an extension of one of said arms on which is mounted a member for engaging said microswitch as said arm extension moves along an arcuate path.

19. An improved lift as in claim 18 which includes:

a) at least one hydraulic cylinder assembly for actuating said lifting assemblies.

20. An improved lift as in claim 19 wherein:
   a) each of said parallelogram arm assemblies includes a hydraulic cylinder;
   b) each pair of arms and end link of said parallelogram comprise U-channel members having spaced side walls; and
   c) said hydraulic cylinder is disposed between planes defined by said side walls, so that said hydraulic cylinder is nestable within said parallelogram arms.

21. In a wheelchair lift having a dual, parallelogram-type arm lifting assembly, a platform connected to said lifting assembly moveable thereby from a first lowered level to an intermediate higher transfer level and thence rotatable to a generally vertical stowed position, and back, at least one hydraulic cylinder assembly actuating each said lifting assembly for movement between said first lowered level, said intermediate transfer level and said vertically stowed position, and a base assembly for mounting said lifting assembly to a vehicle floor to which is mounted said lifting assembly by pivotal connections, the improvements comprising in operative combination therewith:
   a) each of said parallelogram assemblies includes a base member, an end link, and a pair of arms, each of which arm pairs is pivotally connected to said base member and said end link at opposing ends of each of said arms, said arms forming with said end link and said base member generally a parallelogram;
   b) each pair of arms and end link of said parallelogram comprise U-channel members having spaced side walls sized for receiving a hydraulic cylinder nestable therewithin;
   c) said hydraulic cylinder assembly comprises a cylinder having a base end mounted to an upper, inboard pivot connection of said parallelogram and a rod end mounted to a diagonally opposite lower, outboard pivot connection of said parallelogram, and said cylinder assembly is single-acting and is oriented substantially parallel to a diagonal axis across the parallelogram of at least one lifting assembly, said axis being a long axis when the lift is in its first lowered level and a short axis when the lift is in its stowed position;
   d) each said hydraulic cylinder assembly is connected with a fluid power source to pull while lifting said platform upwardly from said lowered position by fluid pressure on a rod side of the hydraulic cylinder, and to operate gravity down;
   e) said hydraulic cylinder is oriented in the platform stowed position with the rod retracted into the cylinder and the cylinder is oriented base-end down;
   f) a hydraulic fluid inlet-outlet of said cylinder is located adjacent an upper rod inlet end of said hydraulic cylinder assembly to provide purging of air accumulating inside said cylinder upon each gravity down portion of an operational cycle;
   g) said pivotal connections of said parallelogram arm lifting assemblies include fixed pin and sleeve means for reducing elongation of pivot bushings associated with said pivotal connections;
   h) said fixed pin and sleeve means are removably secured within the various components of said parallelogram assemblies to permit convenient replacement of said pivot bushings; and
   i) said orientation and linkage of said hydraulic cylinder improves synchronization, reduces drift and/or spongy operation, and reduces arm misalignment binding, side loading and parallelogram arm pivot pin bushing elongation.

22. An improved lift as in claim 21 wherein:
   a) said cylinder base end and said rod end each have a transverse bearing sleeve, each of which sleeves has a central aperture therein for engaging a fixed pin so that said rod end and cylinder base end pivots on said pins;
   b) a pair of pin members mounted in association with each parallelogram arm assembly, each pin member receivingly engaged in said bearing sleeves at the external end of said rod and at said cylinder base end respectively, said pins being non-rotatably fixed with respect to the arms of said parallelogram assembly to which they are mounted; and
   c) said fixed pin providing extended bearing surface to said bearing sleeve to reduce channel hole elongation from extended use under load.

* * * * *